(12) United States Patent
De Zwart et al.

(10) Patent No.: US 10,533,726 B2
(45) Date of Patent: Jan. 14, 2020

(54) OPTICAL ARRANGEMENT, LIGHTING DEVICE AND ILLUMINATION METHOD

(71) Applicant: SIGNIFY HOLDING B.V., Eindhoven (NL)

(72) Inventors: Siebe Tijerk De Zwart, Eindhoven (NL); Jan De Graaf, Eindhoven (NL); Michel Cornelis Josephus Marie Vissenberg, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 16 days.

(21) Appl. No.: 15/320,816

(22) PCT Filed: Jun. 23, 2015

(86) PCT No.: PCT/EP2015/064164
§ 371 (c)(1),
(2) Date: Dec. 21, 2016

(87) PCT Pub. No.: WO2015/197654
PCT Pub. Date: Dec. 30, 2015

(65) Prior Publication Data
US 2017/0153004 A1 Jun. 1, 2017

(30) Foreign Application Priority Data
Jun. 26, 2014 (EP) .................................... 14174013

(51) Int. Cl.
*G02B 27/10* (2006.01)
*F21V 3/06* (2018.01)
(Continued)

(52) U.S. Cl.
CPC .............. *F21V 3/062* (2018.02); *F21V 5/008* (2013.01); *F21V 5/04* (2013.01); *G02B 3/0006* (2013.01); *F21W 2121/00* (2013.01)

(58) Field of Classification Search
CPC ........ F21V 3/0436; F21V 3/062; F21V 5/002; F21V 5/004; F21V 5/007; F21V 5/008;
(Continued)

(56) References Cited

U.S. PATENT DOCUMENTS

| 3,832,541 A | 8/1974 | Bassett et al. |
| 6,282,027 B1* | 8/2001 | Hough ............... G02B 26/0875 |
| | | 359/618 |

(Continued)

FOREIGN PATENT DOCUMENTS

| CN | 201106797 Y | 8/2008 |
| CN | 102668696 A | 9/2012 |

(Continued)

OTHER PUBLICATIONS

Kamal H. et al, "Properties of Moire Magnifiers", Optical Engineering, Soc. of Photo-Optical Instrumentation Engineers, Bellinghan, vol. 37, No. 11, Nov. 1, 1998, pp. 3007-3014, ISSN: 0091-3286, DOI: 10.1117/1.601889.

*Primary Examiner* — William R Alexander
*Assistant Examiner* — Tamara Y. Washington
(74) *Attorney, Agent, or Firm* — Daniel J. Piotrowski (57) ABSTRACT

An optical arrangement comprises two plates, with complementary shaped lens arrays. A decorative image is provided at the plate on the light input side. The plates are displaceable with respect to each other between a pass through mode with the plates in contact or close proximity, and a decorative image mode with the plates apart.

15 Claims, 5 Drawing Sheets

(51) Int. Cl.
*F21V 5/00* (2018.01)
*F21V 5/04* (2006.01)
*G02B 3/00* (2006.01)
*F21W 121/00* (2006.01)

(58) Field of Classification Search
CPC ... F21V 5/04; F21V 7/06; F21V 13/04; F21V 14/06; G02B 3/0006; G02B 3/005; G02B 3/0056; G02B 3/0062; G02B 7/02; G02B 7/022; G02B 15/14; G02B 15/15; G02B 26/00; G02B 26/02; G02B 26/0875; G02B 27/0961; G02B 27/10; G02B 27/2214; F21W 2121/00; G09G 5/00
USPC ....... 359/619, 621, 622, 626, 455, 458, 463, 359/475; 362/268, 297, 555; 345/6
See application file for complete search history.

(56) References Cited

U.S. PATENT DOCUMENTS

| | | | |
|---|---|---|---|
| 6,809,869 B2 * | 10/2004 | Hough | F21V 14/06 359/619 |
| 7,349,159 B2 * | 3/2008 | Shimizu | G02B 3/0031 359/619 |
| 7,486,444 B2 * | 2/2009 | Moriwaka | B23K 26/0648 359/619 |
| 7,948,689 B2 * | 5/2011 | Fukuta | G02B 7/022 359/717 |
| 8,025,822 B2 * | 9/2011 | Miyao | G02B 3/0031 264/1.7 |
| 8,274,745 B2 * | 9/2012 | Fukuta | G02B 7/022 359/717 |
| 9,551,896 B2 * | 1/2017 | Nimura | G02F 1/133526 |
| 2005/0083560 A1 | 4/2005 | Cvetkovich | |
| 2006/0202910 A1 | 9/2006 | Cha et al. | |
| 2014/0009838 A1 | 1/2014 | Weber et al. | |

FOREIGN PATENT DOCUMENTS

| | | |
|---|---|---|
| CN | 202756929 U | 2/2013 |
| EP | 1320771 A1 | 6/2003 |
| JP | 2007/249214 A | 9/2007 |
| WO | 2010091888 A1 | 8/2010 |
| WO | 2010103477 A1 | 9/2010 |
| WO | 2012083529 A1 | 6/2012 |
| WO | 2014036509 A1 | 3/2014 |

* cited by examiner

Prior Art

FIG. 9b

Prior Art

OPTICAL ARRANGEMENT, LIGHTING DEVICE AND ILLUMINATION METHOD

CROSS-REFERENCE TO PRIOR APPLICATIONS

This application is the U.S. National Phase application under 35 U.S.C. § 371 of International Application No. PCT/EP2015/064164, filed on Jun. 23, 2015, which claims the benefit of European Patent Application No. 14174013.4, filed on Jun. 26, 2014. These applications are hereby incorporated by reference herein.

FIELD OF THE INVENTION

This invention relates to an optical arrangement, in particular one which is able to provide general functional illumination to a scene and is able to provide a displayed image as decorative illumination. The invention further relates to a lighting device and to an illumination method comprising said optical arrangement.

BACKGROUND OF THE INVENTION

In some lighting systems, a user is able to do scene setting by dimming and tuning the colour of the light source. In addition to these general illumination functions, decorative patterns are also of interest for users to create an ambience.

Often, lighting systems provide either a decorative function or are functional and there is no possible switching between the two types of lighting in a single system.

Known are lighting devices that enable switching between different functional effects, such as a flood lighting or a spot lighting effect.

US20060202910A1, now abandoned, discloses an optical arrangement with a pair of lens arrays which are mutually moveable to provide a pass through function and a decorative mode. It is a disadvantage of the know arrangement that in the decorative mode images of deteriorating quality are provided.

SUMMARY OF THE INVENTION

It is an object of the invention to provide a compact system in which at least one of the disadvantages of the prior art system is counteracted.

The invention is defined by the claims.

According to an embodiment of the invention, there is provided an optical arrangement, comprising:
 a first plate comprising a main input surface and a first lens array on an output surface;
 a second plate comprising a second lens array on an input surface and an output surface, the second lens array having a complementary shape to the first lens array and extending parallel to the first lens array; and
  a decorative image provided at the first plate,
  wherein the first and second plates are displaceable along a normal to the main input surface with respect to each other between:
   a first configuration in which the first and second lens arrays are together and the first and second plates function to provide a pass through function; and
   a second configuration in which the first and second lens arrays are separated by a distance D and the first and second plates function to provide the decorative image to an output,
  wherein the first lens array comprises an array of negative lenses having a negative focal length Fn, and wherein the decorative image is positioned at the output surface of the first plate or in between said output surface and the negative focal length Fn.

A negative focal length means that in the propagation direction of light the focal length of the lens is upstream with respect to the (negative) lens.

The prior art discloses a pair of lens arrays of which the first lens array comprises positive lenses, with the first lenses in an upstream position relative to the position of the second lens array of negative lenses. For the prior art optical arrangement to work properly, the image must be placed at a distance greater than the focal distance/length f of the positive, convex lens array, even in fact at at least twice the focal distance f. Because of the diverging radiation properties from the decorative image and its relatively large distance from the first lens array, the decorative image is not solely related to a single lens of the first lens array, but to a multiple of lenses from said first lens array. Hence this prior art arrangement results in a relatively large amount of cross-talk, and hence in deteriorated image quality. If, on the other hand, the decorative image is positioned at a shorter distance from the first lens array than the focal distance of the first, positive lens array, the positive lenses cannot refract the incoming radiation pattern/beam to become a converging pattern/beam, and the image will be redirected to various negative lenses of the second lens array. This also results in crosstalk and deteriorated image quality.

The invention solves this problem of crosstalk by a reversed order of positive and negative lens arrays, i.e. the first lens array comprises negative lenses and the second array comprises the complementary positive lenses, and by providing the decorative image as close as possible to, and optimally even on the output surface of, the first lens array. If the decorative image is placed at the output surface of the first (negative) lens array, the negative lens array does not play a role anymore in the image formation process and each image or image portion is only associated with a single, respective lens of the lens array.

To optimally benefit from this feature, the image is preferably provided on the output surface of the first lens array. However, from practical experiments it appeared that a useful range for locating the decorative image or image portions is at the output surface of the first plate or in between said output surface and the negative focal length Fn, projected images of sufficient quality are obtained. This useful range is very convenient as providing the decorative image at the output surface of the first lens array is relatively cumbersome. It is more convenient to situate the decorative image at the input surface of the first lens array, which is generally within 0.5*Fn from the first lens array. Yet, in practice it is preferred to provide the decorative on a separate carrier plate, which is relatively simple and furthermore enables an easy exchange of decorative image. Also, it is then generally still enabled to provide the image within 1*Fn from the first lens array.

The displacement of one lens array with respect to the other enables a lensing function to be implemented when the lenses are not touching and an image is provided to the output for decorative purposes, and a pass through function when the lenses are together. When the lenses are together, the lens arrays meet to define a solid interface as a result of their complementary shapes. By this is meant that the two lens arrays can be brought into contact or near contact over substantially their full area.

The invention thus provides a lighting system that is simple, small and low cost in construction and provides both decorative and functional beam functions in one system. A simple switching arrangement is provided between both functions by means of a mechanical movement.

The first lens array comprises an array of negative lenses. These for example comprise concave lenses (by which is meant that the lens surface projects into the lens body). The second lens array may comprise an array of positive lenses complementary to the negative lenses of the first lens array. These for example comprise convex lenses (by which is meant that the lens surface projects out of the lens body). The positive and negative lenses can meet to define a solid block which has minimal optical effect on the light in the pass-through mode.

The first and second lens arrays may each comprise a two dimensional array of individual lenslets, for example circular lenslets such as microlenses.

The decorative image preferably comprises a repeating pattern of complete images or image portions, with one image or image portion associated with each lens of the first lens array. These complete images or image portions are projected by the system, for example to a fixed projection surface at a predesigned distance from the optical system. The lens arrays may generate multiple versions of the images or image portions (main images and satellite images). If the decorative image comprises stereo image parts, i.e. image parts respectively for the left eye and for the right eye, it is also possible to switch between the pass through function and a projection of a 3D image.

In the second configuration, each image or image portion is preferably focused to the same location at an imaging plane which is a predetermined distance from the output surface of the second optical plate. For this purpose, the pitch between the image or image portions may be greater than the pitch between the lenses of the second lens array to provide focusing of the images or image portions to the same location.

The decorative image may be provided:
on the planar input surface of the first lens array; or
on the output surface of the first lens array; or
on a carrier plate which is placed against the planar input surface of the first lens array.

These provide various options for providing the decorative image.

In the second configuration, the distance between the decorative image and the second lens array may be equal to 0.9 to 1.1 times the focal distance of the lenses of the second lens array, the distance D between the first and second lens arrays being (approximately) the same. This provides imaging of the repeating image portions on the surface at which the decorative image is to be viewed.

The invention further relates to a lighting device comprising a light source facing the main input surface of the first optical plate, the light source being configured to issue light source light towards the main input surface of the first optical plate during operation. For example, the optical arrangement may be provided as a part of a lighting device, for example at the output of a light fitting, for example an LED lamp, for example with a circular outer housing.

The invention also provides an illumination method, comprising:
providing light to an optical arrangement which comprises a first plate comprising a main input surface and a first lens array on an output surface wherein the first lens array comprises an array of negative lenses having a negative focal length Fn, and a second plate comprising a second lens array on an input surface and an output surface, the second lens array having a complementary shape to the first lens array and extending parallel to the first lens array, wherein a decorative image is provided at the output surface of the first plate or in between said output surface and the negative focal length Fn, wherein the method comprises displacing along a normal to the main input surface the first and second plates with respect to each other between:
a first configuration in which the first and second lens arrays are in contact and the first and second plates function to provide a pass through function; and
a second configuration in which the first and second lens arrays are separated by a distance D and the first and second plates function to provide the decorative image to an output.

BRIEF DESCRIPTION OF THE DRAWINGS

Examples of the invention will now be described in detail with reference to the schematic, accompanying drawings, in which.

Some dimensions in the figures may be exaggerated for the sake of explanation and clarity.

DETAILED DESCRIPTION OF THE EMBODIMENTS

Figure 9A:
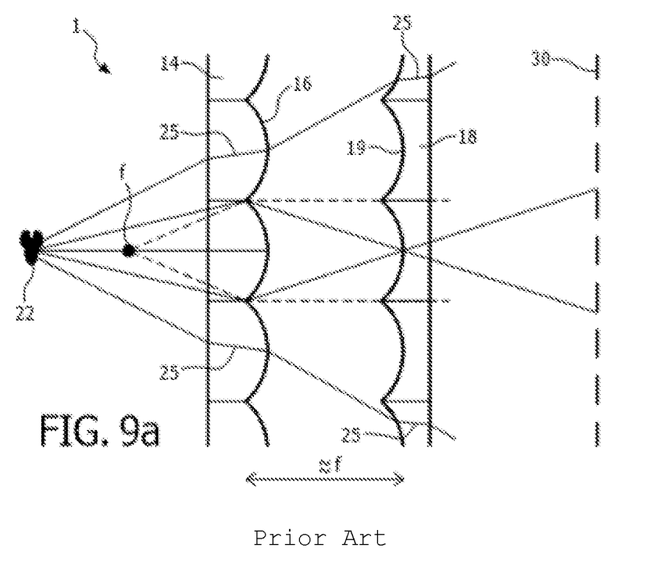
FIGS. 9a and 9b show optical arrangements according to the prior art.
Figure 9B:
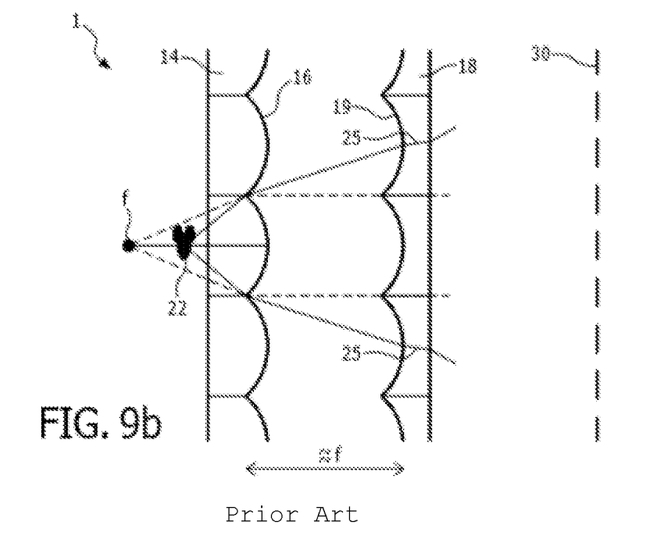

FIGS. 9a and 9b show two variations of an optical arrangement 1 according to the prior art. The prior art arrangement comprises a first plate 14 comprising a first lens array 16 of positive lenses and a second plate 18 comprising a second lens array 19 of negative lenses. The first lens array of positive lenses is placed in an upstream position relative to the position of the second lens array of negative lenses. For the prior art optical arrangement to work properly, the decorative image 22 must be placed at a distance greater than the focal distance/length f of the positive, convex lens array, even in fact at at least twice the focal distance f, this is shown in FIG. 9a. Because of the diverging radiation properties from the decorative image and its relatively large distance form the first lens array, the decorative image is not solely related to a single lens of the first lens array, but to a multiple of lenses from said first lens array. Hence this prior art arrangement results in a relatively large amount of cross-talk 25, and hence in deteriorated image quality on a projection surface 30. If, on the other hand, the decorative image is positioned at a shorter distance from the first lens array than the focal distance of the first, positive lens array, as shown in FIG. 9b, the positive lenses cannot convert the incoming radiation pattern into a converging beam, and the image will be projected on various negative lenses of the second lens array. This also results in crosstalk 25 and deteriorated image quality on the projection surface 30.

The invention provides an optical arrangement, comprising two plates, with complementary shaped lens arrays. A decorative image is provided at the input plate. The plates are displaceable with respect to each other between a pass through mode with the plates in contact or in close proximity, and a decorative image mode with the plates apart.

Figure 1:
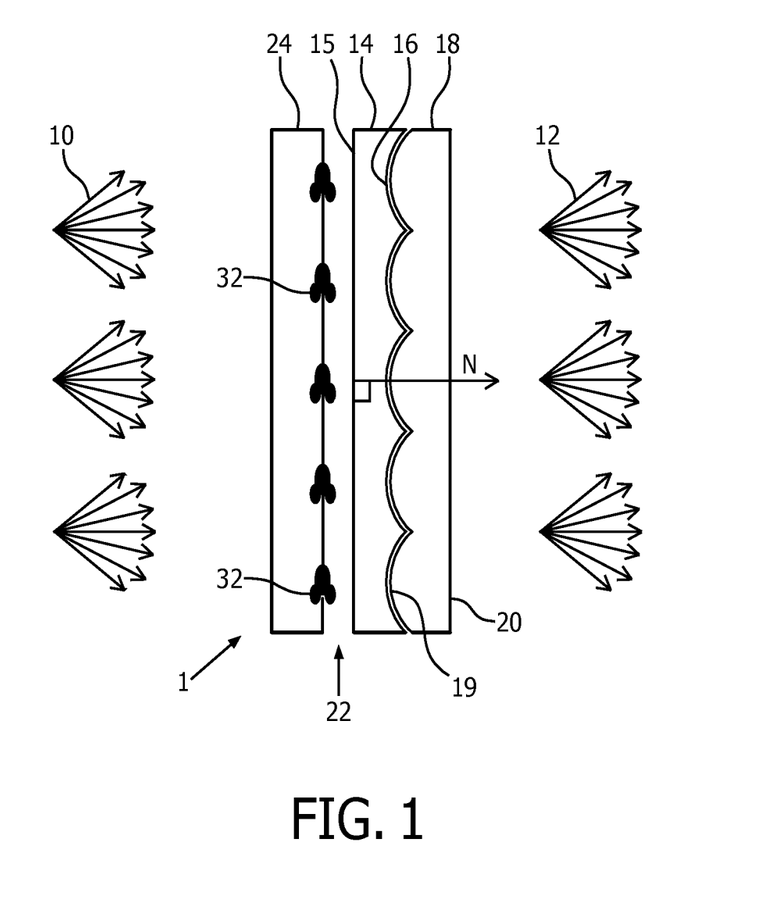
FIG. 1 shows an example of optical arrangement in accordance with the invention, in a first mode.

FIG. 1 shows an optical arrangement 1 in accordance with an embodiment of the invention. The arrangement 1 receives input light 10 and provides exit light 12.

A first plate 14 is on the input side and has a main planar input surface 15 and a first lens array 16 on an output surface. The first lens array 16 comprises an array of negative lenses. These for example comprise concave i.e. female lenses (by which is meant that the lens surface projects into the lens body).

A second plate 18 is on the output side and has a second lens array 19 on an input surface and a planar output surface 20. The second lens array 19 has a complementary shape to the first lens array, thus comprising an array of positive lenses. These for example comprise convex i.e. male lenses (by which is meant that the lens surface projects out of the lens body).

The positive and negative lenses can meet with the lens arrays mated to define a solid block which has minimal optical effect on the light, and thereby define a pass through mode. The lens arrays may physically meet in this pass through mode, but the optical performance is not altered significantly if there is a gap which is small compared to focal depths of the lenses.

A decorative image 22 is provided at the first plate. In the example of FIG. 1, this decorative image is provided on a carrier plate 24, but it may be provided on the first plate 14 itself.

The first and second plates are displaceable along a normal N to the main input surface 15 with respect to each other between first and second configurations. In the first configuration, the first and second lens arrays are together and the first and second plates function to provide a pass through function. This configuration is shown in FIG. 1, and the two plates function as a single parallel plate block. Some Fresnel reflections occur and the decorative pattern does cause some light loss or scattering, but the beam profile of the incident beam 10 remains unchanged.

In a second configuration, the first and second lens arrays are separated by a distance D (see FIG. 2) and the first and second plates function to provide the decorative image 22 to the output.

Figure 2:
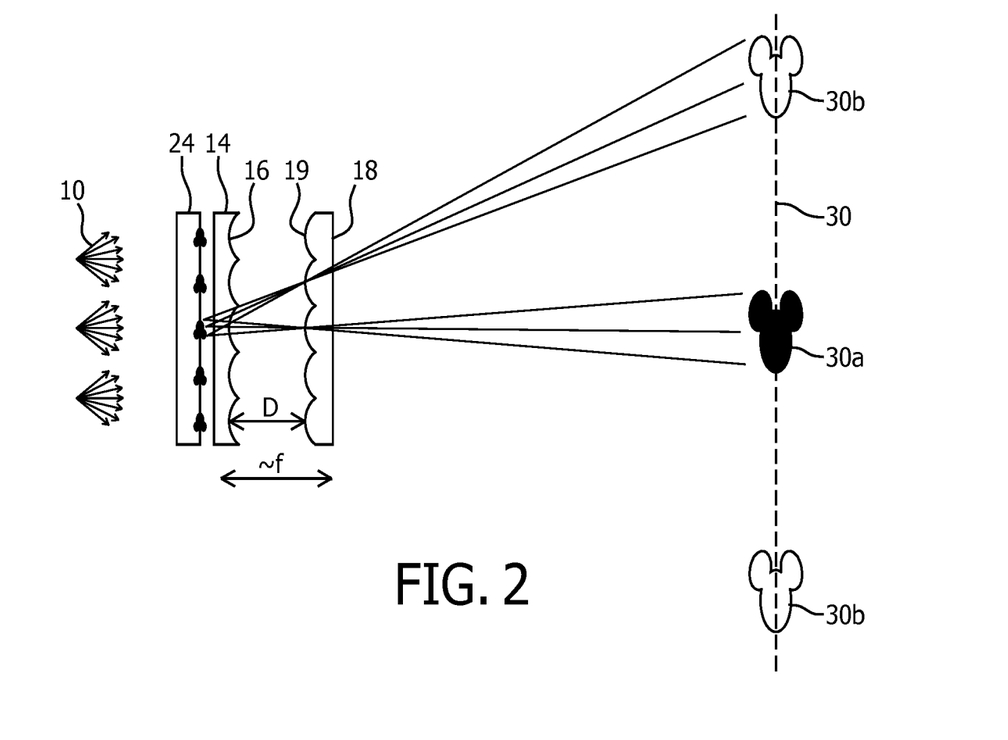
FIG. 2 shows the optical arrangement in a second mode.

FIG. 2 shows the system in the second configuration. The lenses of the first lens array 16 on the first plate 14 have a negative focal length Fn, which in absolute value is equal to a focal distance f of the positive lenses of the second lens array. The spacing of the second lens array 19 on the second plate 18 from the decorative image is approximately equal to this distance f, for example between 0.9 f and 1.1 f, which is approximately the same as distance D.

The effect of the male-female lens pairs is to image (and invert) local portions of the decorative image onto a viewing plane 30 at a designed distance from the optical system. As shown in FIGS. 1 and 2, the decorative image comprises a repeating pattern of image portions 32, with one image portion associated with each lens of the first lens array 16. These image portions are projected by the system to the fixed projection surface 30. The lens arrays generate multiple versions of the image portions (main images 30a and satellite images 30b where the light passes through neighboring lenses). All of these individual main image portions together form a single resulting image and the satellite images also form a repeating pattern on the surface.

The displacement of one lens array with respect to the other enables a beam shaping function to be implemented when the lenses are apart and an image is provided to the output for decorative purposes.

The invention thus provides a lighting system that is simple, small and low cost in construction and provides both decorative and functional beam functions in one system. A simple switching arrangement is provided between both functions by means of a mechanical movement. This can be implemented manually by a user or it may be under control of a motor arrangement.

Figure 3:
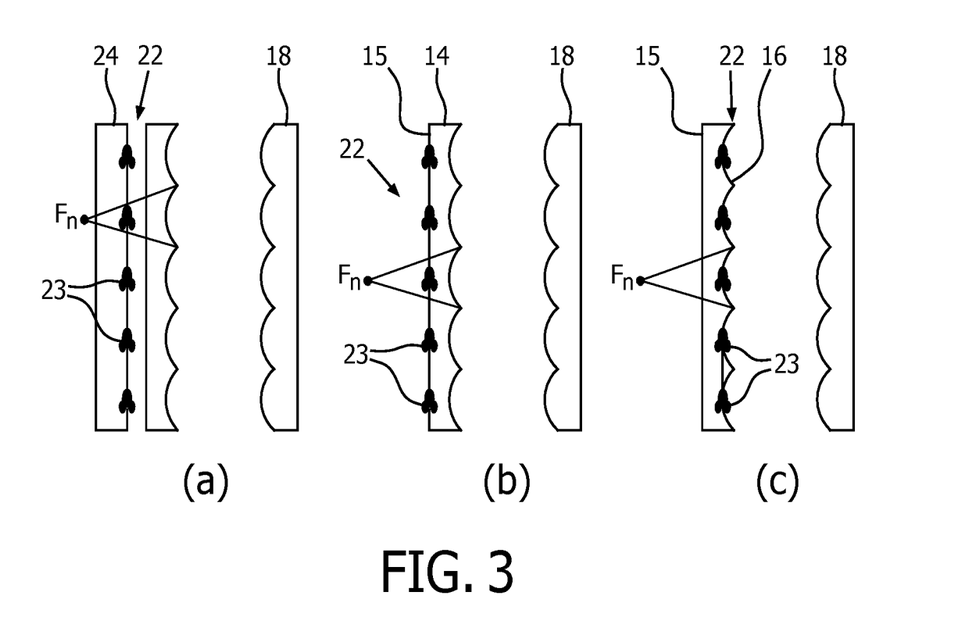
FIG. 3 shows some alternative positions for the decorative image portions.

FIG. 3 shows various options for the decorative image. In FIG. 3 the decorative image comprises a repeating pattern of whole images 23, with each image being associated with a respective lens of the first lens array. FIG. 3(a) shows the arrangement of FIGS. 1 and 2 in which the image is provided on a transparent carrier plate 24 which is placed against the planar input surface of the first lens array.

FIG. 3(b) shows the decorative image applied to the planar main input surface 15 of the first plate 14 and FIG. 3(c) shows the decorative image applied to the output surface 16 of the first lens array 14. These provide various options for providing the decorative image. As shown in FIGS. 3a-c, each of the negative lenses of the first lens array has a negative focal length Fn. In FIG. 3a the decorative image is located in between the output surface of the first lens array and the focal length Fn, i.e. at about 0.6*Fn. In FIG. 3b the decorative image is provided in between the output surface of the first lens array and 0.5*Fn, i.e. at about 0.4*Fn. In FIG. 3c the decorative image is provided at the output surface of the first lens array, i.e. at 0*Fn.

The lenses are designed to ensure imaging of the decorative image at the designed surface 30. The optical considerations to achieve this will now be discussed.

Figure 4:
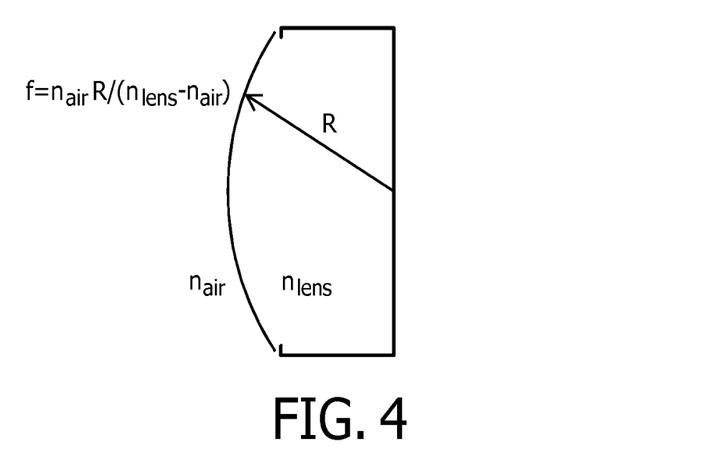
FIG. 4 shows how a lens focal distance is defined.

FIG. 4 shows the how the focal distance is derived for a spherical (i.e. constant radius) lens in air. With a lens radius R, the focal distance is given by:

$$f = n_{air} R (n_{lens} - n_{air})$$

where $n_{air}$ is the refractive index of air (i.e. $n_{air}=1$) and $n_{lens}$ is the refractive index of the lens material.

Figure 5:
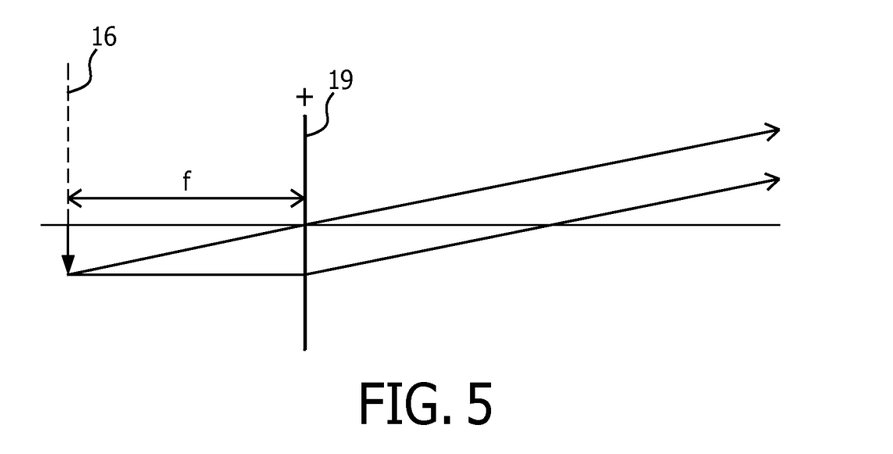
FIG. 5 is used to explain a first relationship to provide the desired focusing.

FIG. 5 shows the optical arrangement if the negative lens function is not taken into account. This is a reasonable assumption if the decorative pattern is placed at or close to the focal point of the positive lens array 19 and if the pattern is close to or at the negative lens array 16. The image is at the focal distance f from the second lens array 19. As shown in FIG. 5 the projected image is substantially parallel and only converges in the distance at the desired surface 30. The distance at which the image converges will depend on the deviation of the spacing from the value f (which instead gives a collimated output image that does not focus).

Figure 6:
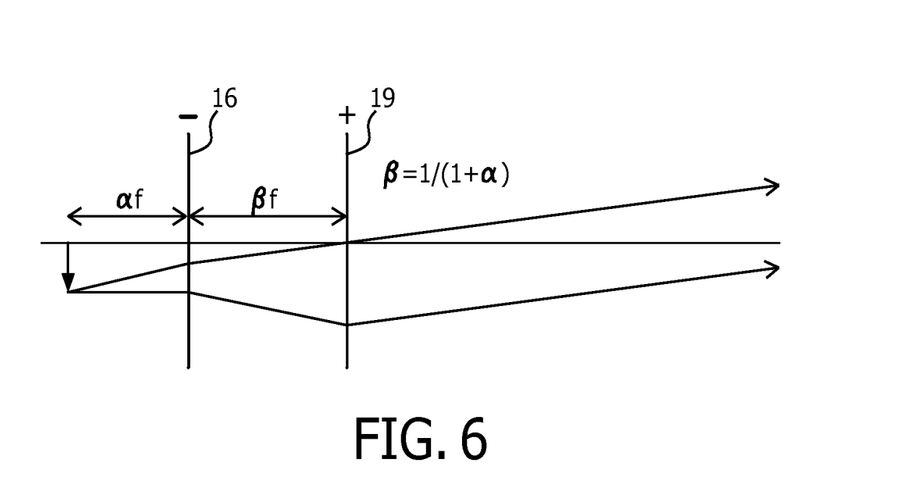
FIG. 6 is used to explain a second relationship to provide the desired focusing.

If the negative lens cannot be neglected, imaging of the pattern is still possible. FIG. 6 shows the relation that has to be fulfilled to provide proper imaging. In this case, the second lens arrays 16,19 are assumed to be thin. For a practical design also the lens to substrate thickness should be taken into account.

In FIG. 6, f is again the focal distance of the lenses of the lens array 19. The distance between the image and the first lens array 16 is a first multiple α (<1) of this focal distance and the distance between the first lens array 16 and the second lens array 19 is a second multiple β (<1) of this focal distance, wherein:

$$\beta = 1/(1+\alpha).$$

Again small deviations from this configuration result in the image being focused rather than being projected in collimated form to infinity.

Figure 7:
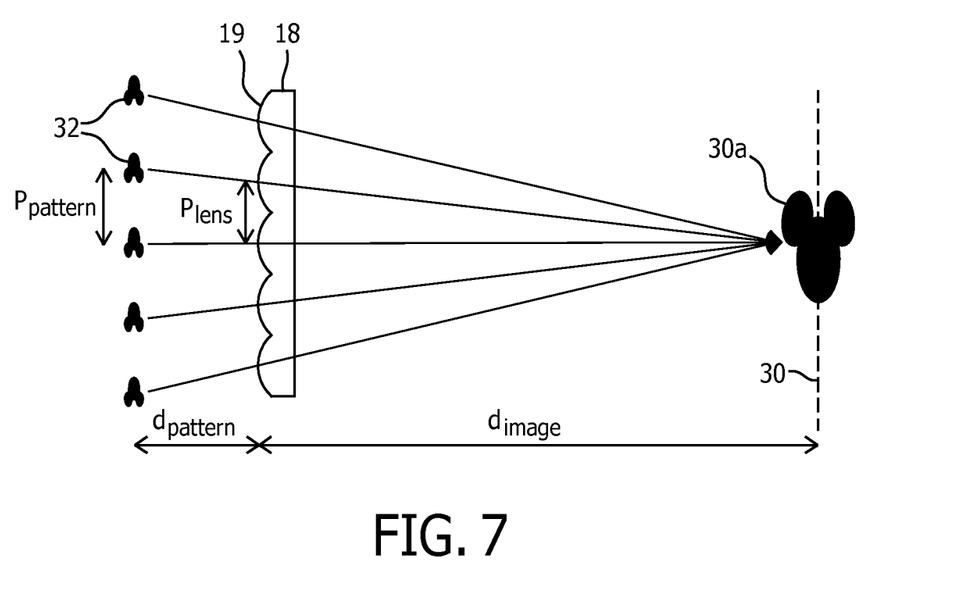
FIG. 7 is used to explain a pitch relationship to provide the desired convergence of image portions at an imaging plane.

To provide focusing of the different image portions 32 to the same location at the imaging plane 30, the pitch between the image portions 32 is greater than the pitch $p_{lens}$ between the lenses of the second lens array 19.

This is shown in FIG. 7.

There are two conditions to create a single main image from the overlap of all of the image portions 32.

First, the image portions are all in focus at the imaging plane 30 if:

$$d_{pattern} = d_{image} f/(d_{image} - f)$$

where $d_{pattern}$ is the distance between the image portions 32 and the second lens array 19, $d_{image}$ is the distance between the second lens array 19 and the imaging plane 30 and f is the focal distance of the lenses of the second lens array 19.

Second, the images coincide if:

$$p_{pattern}/p_{lens} = 1 + d_{pattern}/d_{image}$$

where $p_{pattern}$ is the pitch of the image portions 32 and $p_{lens}$ is pitch of the lenses of the second lens array 19.

In this way, the image portions all converge to a single enlarged (and inverted) image at the imaging plane. In the same way, the satellite images also overlap.

The image portions are preferably identical images so that they create a single image at the imaging plane.

Figure 8:
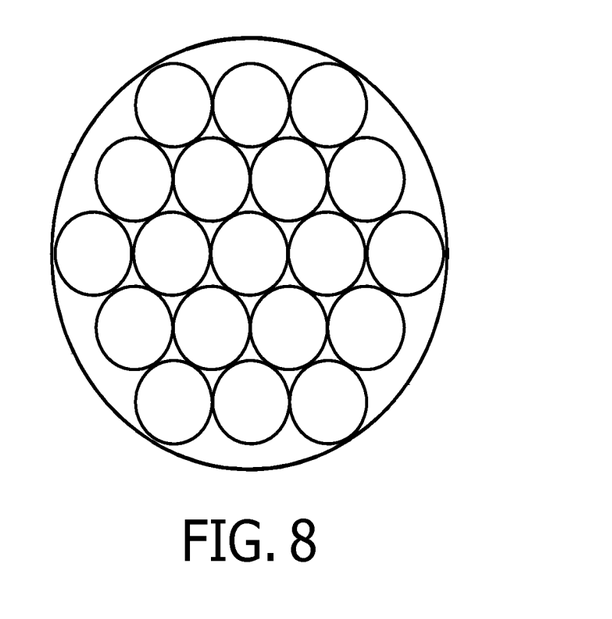
FIG. 8 shows one possible arrangement of lenslets for the first and second array of lenses.

The lenses of the first and second arrays are individual lenslets (i.e. microlenses). They are preferably circular and arranged in a regular array, for example with the centers of the circles forming a hexagonal grid, as shown in FIG. 8. Each lens images the full associated image portion onto the imaging plane.

The optical arrangement may be provided as a part of a lighting device, for example at the output of a light fitting, for example an LED lamp, for example with a circular outer housing. The lamp and outer housing are designed to provide a desired beam profile (10 in FIG. 1) which is incident on the optical arrangement. This can be any suitable beam profile, for example a near collimated spot light beam, or a diverging flood light beam. This beam profile is preserved when the lens arrays are brought together, but when the lens arrays are moved apart an image is formed at a desired distance from the light source.

A lighting unit incorporating the optical arrangement may have a wireless receiver for receiving RF commands which control the setting of the optical arrangement, and a motor for setting the configuration. Additional features of the lighting unit may be controlled such as pan and tilt of the lighting unit so that a user can control the illumination direction. Aspects of the light output may also be controlled such as the colour, beam size and shape and intensity.

The invention also provides an illumination method, comprising providing light to the optical arrangement as described above. The method comprises displacing the first and second plates with respect to each other between the first configuration in which the first and second lens arrays are together to provide a pass through function and the second configuration in which the first and second lens arrays are separated to provide the decorative image.

When the lens arrays are together, they may be in contact, or else the spacing is less than 5% of the focal distance of the lenses of the second array. When they are apart, the spacing is of the order of magnitude of the focal distance.

The lens arrays may optionally be movable to intermediate positions. For example, the image sharpness may be controllable by adjusting the distance between the lens arrays. The adjustment range is however relatively small, since pitch adjustment would also be needed to enable a larger control of the focus distance.

An example of the typical size of a lenslet is a 3 mm pitch, and a radius of curvature in the range 3 mm-10 mm. These dimensions can however be scaled down or up. Thus, the pitch may for example be in the range 1 mm to 10 mm and the radius of curvature may be in the range 1 mm to 30 mm. A typical size of each lens array is of the order of a few cm for the diameter of a circular arrangement, for example 6 cm. For example, the diameter may be in the range 3 cm to 10 cm, and this gives hundreds of lenslets per array, for example there may be 100 to 1000 lenslets. For a 6 cm diameter lens array with a pitch of 3 mm, there are around 400 lenslets in each array.

The invention can be applied for home, office or industrial (e.g. shop) use.

The invention can be used for LED lighting. More generally the light source may comprise a solid state light source, but other types of light source may also be used. The optical plates may comprise a polymeric material, for example one or more materials selected from the group consisting of PE (polyethylene), PP (polypropylene), PEN (polyethylene napthalate), PC (poly-carbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), (PETG) (glycol modified polyethylene terephthalate), PDMS (polydimethylsiloxane), and COC (cyclo olefin copolymer). However, other (co)polymers may also be possible.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An optical arrangement, comprising:
    a first plate comprising a main input surface and a first lens array on an output surface of the first plate;
    a second plate comprising a second lens array on an input surface of the second plate and an output surface, the second lens array having a complementary shape to the first lens array and extending parallel to the first lens array; and
    a decorative image provided at the first plate,
    wherein the first and second plates are displaceable along a normal to the main input surface with respect to each other between:
    a first configuration in which the first and second lens arrays are together and the first and second plates function to provide a pass through function; and
    a second configuration in which the first and second lens arrays are separated by a distance D and the first and second plates function to provide the decorative image to an output,
    wherein the first lens array comprises an array of negative lenses having a negative focal length Fn, and wherein the decorative image is positioned at the output surface of the first plate or in between said output surface of the first plate and the negative focal length Fn.

2. An optical arrangement as claimed in claim 1, wherein the decorative image is placed in between the output surface of the first plate and 0.5*Fn.

3. An optical arrangement as claimed in claim 2, wherein the second lens array comprises an array of positive lenses.

4. An optical arrangement as claimed in claim 1, wherein the main input surface of the first plate is planar and the output surface of second plate is planar.

5. An optical arrangement as claimed in claim 1, wherein the first and second lens arrays each comprise a two dimensional array of individual lenslets.

6. An optical arrangement as claimed in any claim 5, wherein the individual lenslets are circular.

7. An optical arrangement as claimed in claim 1, wherein the decorative image comprises a repeating pattern of whole images or image portions, with one image or image portion associated with each lens of the first lens array.

8. An optical arrangement as claimed in claim 7, wherein, in the second configuration, each image or image portion is focused to the same location at an imaging plane which is a predetermined distance from the output surface of the second plate.

9. An optical arrangement as claimed in claim 8, wherein a pitch ($p_{pattern}$) between the images or image portions is greater than a pitch ($p_{lens}$) between the lenses of the second lens array to provide focusing of the images or image portions to the same location.

10. An optical arrangement as claimed in claim 1, wherein the decorative image is provided:
on the main input surface of the first plate; or
on the first output surface of the first plate; or
on a carrier plate which is placed against the main input surface of the first plate.

11. An optical arrangement as claimed in claim 1, wherein, in the second configuration, the distance between the decorative image and the second lens array is equal to 0.9 to 1.1 times the focal distance of the lenses of the second lens array.

12. A lighting device comprising an optical arrangement as claimed in claim 1, and comprising a light source facing the main input surface of the first plate, the light source being configured to issue light source light towards the main input surface of the first optical plate during operation.

13. An illumination method, comprising:
providing light to an optical arrangement which comprises a first plate comprising a main input surface and a first lens array on an output surface of the first plate wherein the first lens array comprises an array of negative lenses having a negative focal length Fn, and a second plate comprising a second lens array on an input surface of the second plate and an output surface, the second lens array having a complementary shape to the first lens array and extending parallel to the first lens array, wherein a decorative image is provided at the output surface of the first plate or in between said output surface of the first plate and the negative focal length Fn,
wherein the method comprises displacing along a normal to the main input surface the first and second plates with respect to each other between:
a first configuration in which the first and second lens arrays are together and the first and second plates function to provide a pass through function; and
a second configuration in which the first and second lens arrays are separated by a distance D and the first and second plates function to provide the decorative image to an output.

14. A method as claimed in claim 13, wherein the second lens array comprises an array of positive lenses and the decorative image comprises a repeating pattern of images or image portions, with one image or image portion associated with each lens of the first lens array, and
wherein the method further comprises, in the second configuration, focusing each image portion to the same location at an imaging plane which is a predetermined distance from the output surface of the second plate.

15. A method as claimed in claim 13, wherein the decorative image is provided:
on the main input surface of the first plate; or
on the first output surface of the first plate; or
on a carrier plate which is placed against the main input surface of the first plate.

* * * * *